(12) United States Patent
Hong et al.

(10) Patent No.: US 10,879,554 B2
(45) Date of Patent: Dec. 29, 2020

(54) THIN FILM BATTERY

(71) Applicant: ROUTEJADE INC., Nonsan-si (KR)

(72) Inventors: Ji Jun Hong, Gwacheon-si (KR); In Joong Kim, Nonsan-si (KR); Young Ho Jung, Gyeryong-si (KR); Young Hun Jin, Gyeryong-si (KR); Taek Joo Jung, Sejong-si (KR)

(73) Assignee: ROUTEJADE INC., Nonsan-si (KR)

( * ) Notice: Subject to any disclaimer, the term of this patent is extended or adjusted under 35 U.S.C. 154(b) by 210 days.

(21) Appl. No.: 16/071,382

(22) PCT Filed: Jan. 19, 2017

(86) PCT No.: PCT/KR2017/000691
§ 371 (c)(1),
(2) Date: Jul. 19, 2018

(87) PCT Pub. No.: WO2017/126921
PCT Pub. Date: Jul. 27, 2017

(65) Prior Publication Data
US 2020/0168940 A1 May 28, 2020

(30) Foreign Application Priority Data

Jan. 21, 2016 (KR) .................. 10-2016-0007353

(51) Int. Cl.
*H01M 10/04* (2006.01)
*H01M 2/16* (2006.01)
*H01M 10/0565* (2010.01)

(52) U.S. Cl.
CPC ..... *H01M 10/0436* (2013.01); *H01M 2/1673* (2013.01); *H01M 10/0565* (2013.01)

(58) Field of Classification Search
CPC .......... H01M 10/0436; H01M 2/1673; H01M 10/0565; H01M 10/0486; H01M 10/058; H01M 4/13; H01M 4/139
See application file for complete search history.

(56) References Cited

U.S. PATENT DOCUMENTS

2002/0041999 A1*  4/2002  Moutsios ............ H01M 2/0212
                                                                429/224
2002/0182490 A1* 12/2002  Cho .................... H01M 4/13
                                                                429/144
2007/0059605 A1   3/2007  Nakamura et al.

FOREIGN PATENT DOCUMENTS

| JP | 09-251863 A | 9/1997 |
| KR | 10-2001-0086415 A | 9/2001 |
| KR | 10-2002-0019003 A | 3/2002 |
| KR | 10-2006-0124978 A | 12/2006 |

(Continued)

*Primary Examiner* — Maria Laios
*Assistant Examiner* — George Kim
(74) *Attorney, Agent, or Firm* — Novick, Kim & Lee, PLLC; Jae Youn Kim

(57) ABSTRACT

A thin film battery includes: a cathode body; and an anode body which is laminated on at least one of an upper portion or a lower portion of the abode body, in which the cathode body includes: a cathode plate on which a cathode active material is applied; a pair of separators which covers an upper surface and a lower surface of the cathode plate; and a polymer insulating film unit interposed between the pair of separators and a portion of the polymer insulating film unit which protrudes outwardly from an edge of the separator is bonded to an anode plate of the anode body.

7 Claims, 6 Drawing Sheets

(56) References Cited

FOREIGN PATENT DOCUMENTS

| KR | 10-2011-0007524 A | 1/2011 |
|----|-------------------|--------|
| KR | 10-2011-0138718 A | 12/2011 |
| KR | 10-2011-0138719 A | 12/2011 |
| KR | 10-1192079 B1 | 10/2012 |
| TW | 201308382 A | 2/2013 |
| WO | 2013110182 A | 1/2013 |

\* cited by examiner

THIN FILM BATTERY

TECHNICAL FIELD

The present invention relates to a thin film battery, and more particularly, to a thin film battery which is configured to fix a positive electrode plate and a negative electrode plate to each other without using a tape or a binder for fixing the positive electrode plate and the negative electrode plate to each other.

BACKGROUND ART

Recently, as portable electronic devices and information communication devices have become smaller, a thin film battery is being developed as an ultra-small power source for driving the devices.

A thin film battery means a thin film type battery which is formed by laminating one or two sheets of positive electrode plates and negative electrode plates which are very thin and a thickness of the battery is approximately 0.4 to 0.5 mm.

Specifically, the thin film battery may be used for a liquid crystal display, an electronic calculator, an IC card, a temperature sensor, a pressure sensing buzzer, or an iontophoresis device for delivering drugs, or a smart credit card.

Such a thin film battery is advantageously applied to various types of ultra-small sized electronic devices having a small thickness, such as a smart credit card.

However, since thin film type positive electrode plate and negative electrode plate are used for the thin film battery, a capacity thereof is low. Further, a battery performance in a basically low battery capacity is degraded due to a gap between electrode plates caused by a pressure by an internally generated gas.

Further, since the overall thickness of the battery is small, when a laminated state of the positive electrode plate and the negative electrode plate is deviated due to an external force, a performance of the battery may be adversely affected. In order to solve the above-mentioned problem, the positive electrode plate and the negative electrode plate are tied by a tape to be fixed or a binder is applied on a separator located between the positive electrode plate and the negative electrode plate to fix the positive electrode plate and the negative electrode plate to each other.

As described above, in the related art, the positive electrode plate and the negative electrode plate are prevented from being loosened by a taping method of wrapping the positive electrode plate and the negative electrode plate with a tape or a method of applying an adhesive, such as a binder, onto a part of an area of a separator interposed between the positive electrode plate and the negative electrode plate. Between the above-mentioned methods, according to the taping method, the thickness of the battery is increased due to the thickness of the tape.

Therefore, the applicant suggests the present invention to solve the above-mentioned problem and as the related art, "thin film battery and fabrication method thereof" (Korean Unexamined Patent Application Publication No. 10-2006-0124978) is disclosed.

DISCLOSURE

Technical Problem

An aspect of the present invention provides a thin film battery which is capable of fixing or bonding thin film type positive electrode plate and negative electrode plate to each other without using a tape or a separate binder or an adhesive.

An aspect of the present invention also provides a thin film battery which minimizes the degradation of a battery performance even when the positive electrode plate and the negative electrode plate are bonded or fixed to each other.

Technical Solution

According to an aspect of the present invention, there is provided a thin film battery including a positive electrode body and a negative electrode body which is laminated on at least one of an upper portion or a lower portion of the positive electrode body, in which the positive electrode body includes a positive electrode plate on which a positive electrode active material is applied, a pair of separators which covers an upper surface and a lower surface of the positive electrode plate, and a polymer insulating film unit interposed between the pair of separators, and a portion of the polymer insulating film unit which protrudes outwardly from an edge of the separator is bonded to a negative electrode plate of the negative electrode body.

Further, the positive electrode body may include a positive electrode tab on which the positive electrode active material is not applied, the separators may cover both surfaces of the positive electrode plate to expose the positive electrode tab to the outside of the separators, and the polymer insulating film unit which is bonded to the negative electrode plate of the negative electrode body may be formed along the entire vertical direction or the entire horizontal direction of the positive electrode plate or is formed in a part of the vertical direction or a part of the horizontal direction of the positive electrode plate.

Further, a sum of a length of a vertical direction of the separator and a length of a vertical direction of the polymer insulating film unit which is exposed to the outside of the vertical direction of the separator may be equal to a length of a vertical direction of the negative electrode plate.

Further, a sum of a length of a horizontal direction of the separator and a length of a horizontal direction of the polymer insulating film unit which is exposed to the outside of the horizontal direction of the separator may be equal to a length of a horizontal direction of the negative electrode plate.

Further, the polymer insulating film unit may include a portion which is covered by the separator and a portion which is not covered by the separator to be exposed from the separator and the positive electrode body and the negative electrode body may be laminated such that an edge of the portion of the polymer insulating film unit which is exposed from the separator is aligned with an edge of the negative electrode body.

Further, the edge of the negative electrode body and an edge of the polymer insulating film unit which face each other may be formed to be aligned with each other.

Further, a portion of the polymer insulating film unit which protrudes outwardly from an edge of the separator may be bonded to a negative electrode tab which protrudes from the negative electrode plate.

Further, a width of a portion of the polymer insulating film unit which protrudes outwardly from the edge of the separator may be smaller than a width of the negative electrode tab.

Further, the polymer insulating film includes an upper layer, an intermediate layer, and a lower layer and the upper layer and the lower layer are formed of ethylene vinyl acetate and the intermediate layer is formed of polyethylene terephthalate, so that the upper layer or the lower layer may be melted by heat to be bonded to the negative electrode plate of the negative electrode body.

Further, the positive electrode body may be formed to be a pocketing positive electrode body.

Advantageous Effects

According to the exemplary embodiment of the present invention, the positive electrode body and the negative electrode body are fixed or coupled to each other while intactly maintaining a contact active surface of the positive electrode body and the negative electrode body so that the battery capacity is maintained as it is, thereby preventing the degradation of the battery performance.

According to the exemplary embodiment of the present invention, in the thin film battery, the positive electrode body and the negative electrode body are fixed or coupled to each other without using an adhesive applying agent such as a tape or a binder so that a cost for a material of the battery or a producing cost may not be increased.

Further, according to the exemplary embodiment of the present invention, in the thin film battery, a separate process for fixing or coupling the positive electrode body and the negative electrode body to each other is not necessary, so that a producing process of the battery may be simplified and a productivity may be increased.

MODE FOR INVENTION

Advantages and characteristics of the present invention and a method of achieving the advantages and characteristics will be clear by referring to exemplary embodiments described below in detail together with the accompanying drawings.

However, the present invention is not limited to the following exemplary embodiments but may be implemented in various different forms. The exemplary embodiments are provided only to complete the disclosure of the present invention and to fully provide a person having ordinary skill in the art to which the present invention pertains with the category of the disclosure, and the present invention will be defined by the appended claims.

Hereinafter, a thin film battery according to an exemplary embodiment of the present invention will be described with reference to FIGS. 1 to 5. In describing the present invention, a detailed description of publicly known functions or configurations incorporated herein will be omitted so as not to make the subject matter of the present invention unclear.

Figure 1:
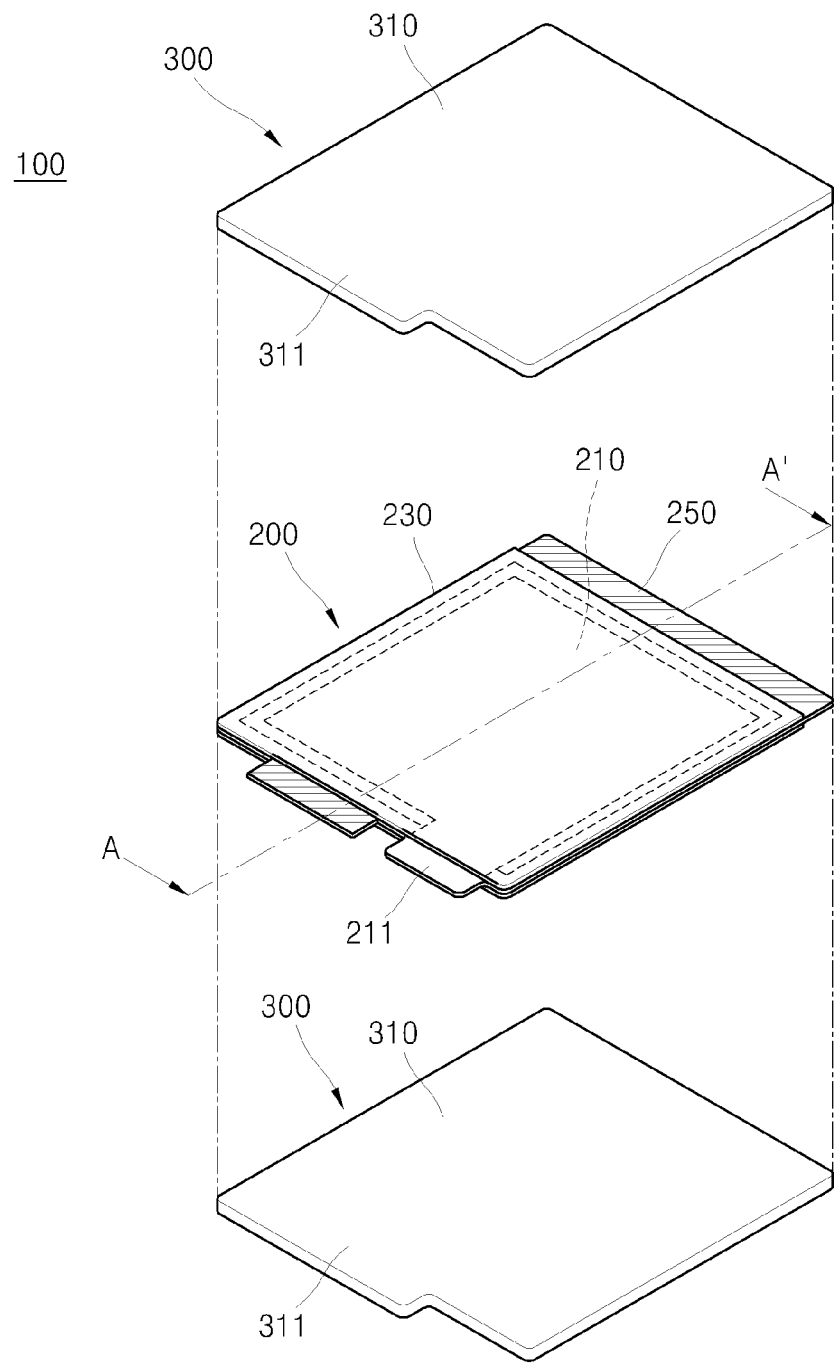
FIG. 1 is an exploded perspective view of a thin film battery according to an exemplary embodiment of the present invention.
Figure 2:
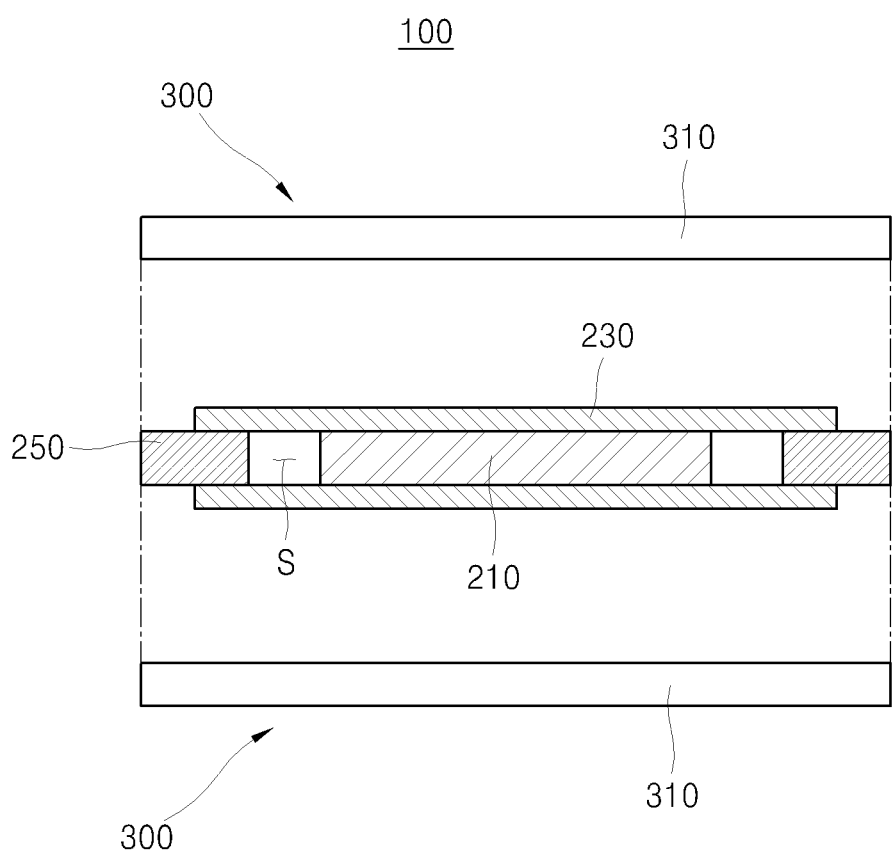
FIG. 2 is a cross-sectional view of a thin film battery taken along the line A-A' of FIG. 1.

As illustrated in FIGS. 1 and 2, a thin film battery 100 according to an exemplary embodiment of the present invention may include a positive electrode body 200 and a negative electrode body 300 laminated or stacked on the positive electrode body 200. Here, the thin film battery 100 according to the exemplary embodiment of the present invention may be formed by laminating one sheet of positive electrode body 200 and one or two sheets of negative electrode bodies 300. In FIG. 1, a thin film battery 100 formed by laminating one sheet of positive electrode body 200 and two sheets of negative electrode bodies 300 is exemplarily illustrated.

The positive electrode body 200 and the negative electrode body 300 may be formed to be a thin film having a thickness of 1 mm or smaller or desirably 0.4 to 0.5 mm by deposing an active material by a known depositing method such as a sputtering method.

Further, the positive electrode body 200 and the negative electrode body 300 may be formed in various shapes including not only a constant shape, such as a rectangular shape, a polygonal shape, a circular shape, or a coin shape, but also an asymmetric shape. Therefore, the thin film battery 100 according to the exemplary embodiment of the present invention may be implemented as a thin film battery using various external materials, such as a rectangular pouch type battery or a coin type battery.

Hereinafter, for the convenience of understanding, it will be described that the positive electrode body 200 and the negative electrode body 300 of the thin film battery 100 according to an exemplary embodiment of the present invention have a rectangular shape.

Figure 3:
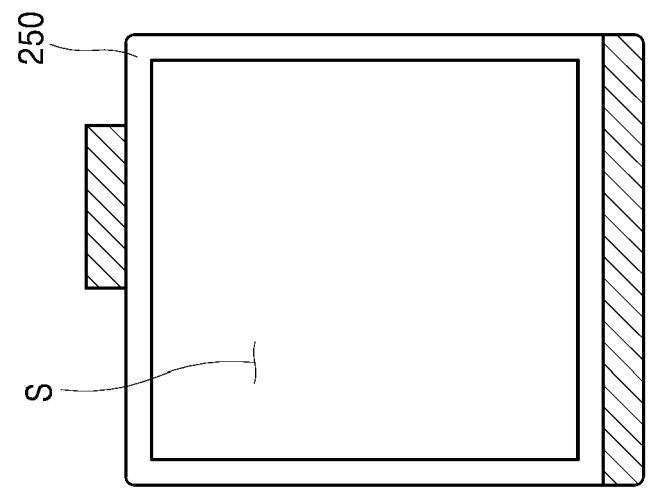
FIG. 3 is a plan view of a positive electrode plate, a separator, and a polymer insulating film unit according to an exemplary embodiment of the present invention, as seen from the top.
Figure 3:
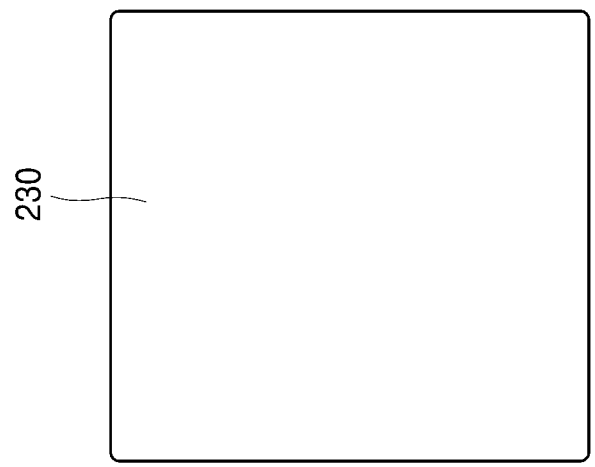
Figure 3:
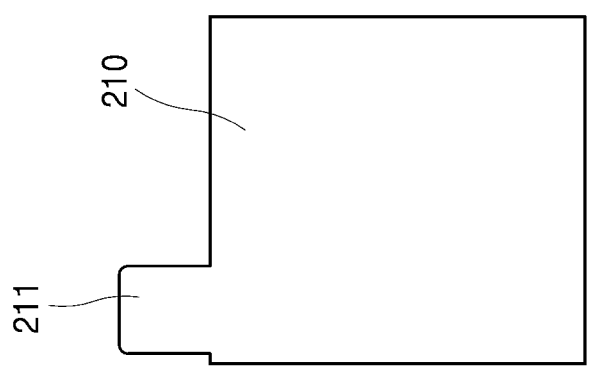
Figure 4:
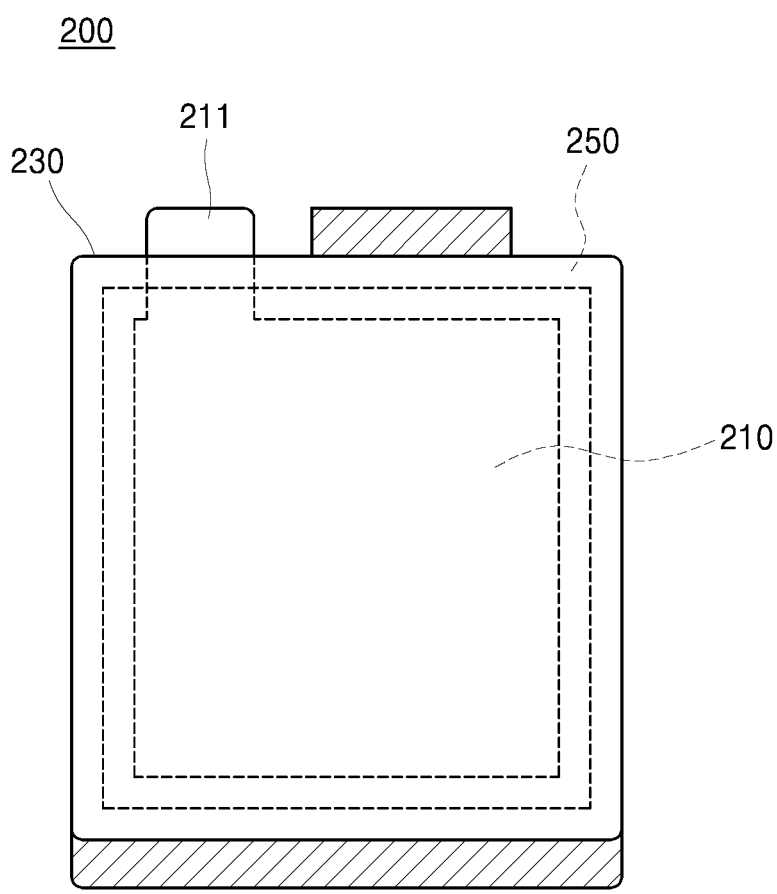
FIG. 4 is a view of a state in which a positive electrode plate, a separator, and a polymer insulating film unit illustrated in FIG. 3 are coupled to form a positive electrode body, as seen from the top.
Figure 5:
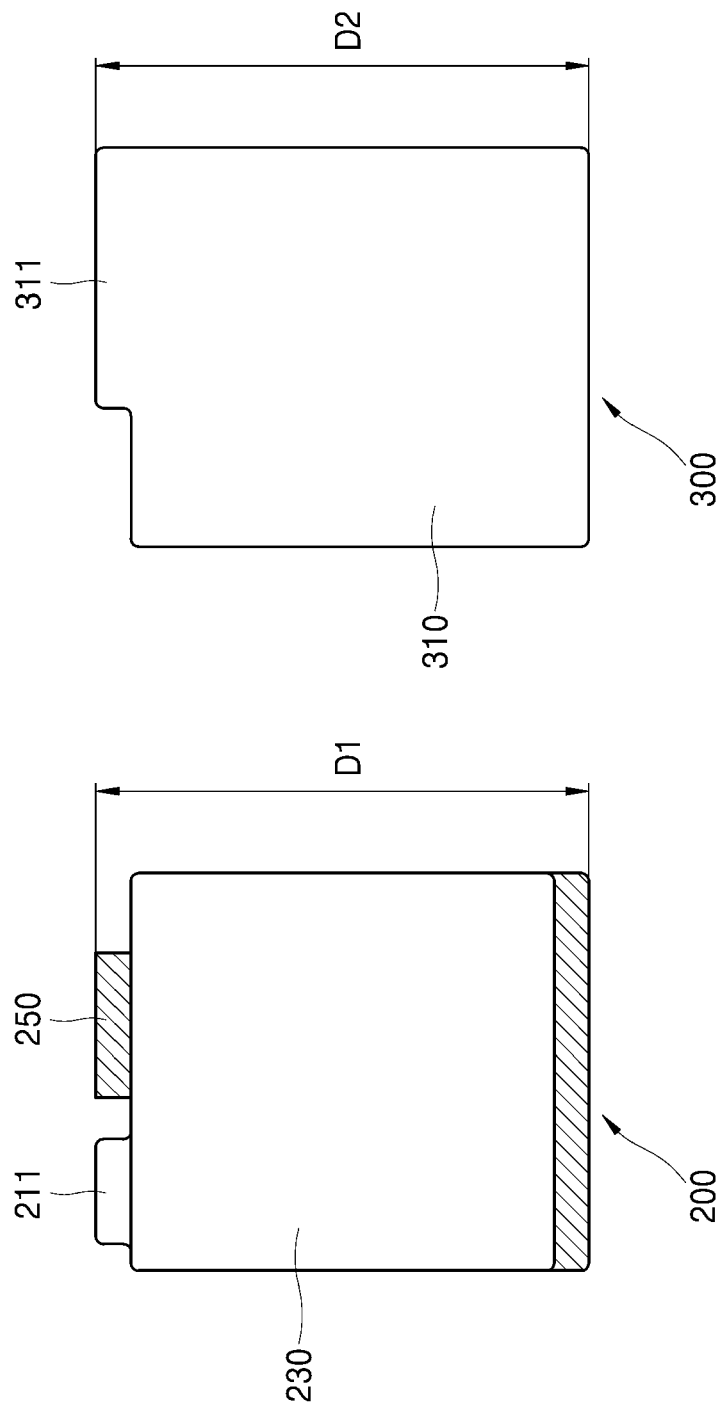
FIG. 5 is a plan view of a positive electrode body and a negative electrode body according to an exemplary embodiment of the present invention.

As illustrated in FIGS. 3 and 4, the positive electrode body 200 may include an positive electrode plate 210 applied with a coating layer of lithium or lithium metal composite oxide as a positive electrode active material, one pair of separators 230 which is coated on both surfaces of the positive electrode plate 210 while exposing only a positive electrode tab 211 protruding from one end of the positive electrode plate 210, and a polymer insulating film unit 250 which is disposed on a part or all of the periphery of the positive electrode plate 210 to be located between the pair of separators 230 to be bonded to the pair of separators 230.

The positive electrode plate 210 is formed to be smaller than the negative electrode plate 300 and the above-mentioned positive electrode active material or metal composite oxide is coated on both surfaces thereof to form a coating layer. For reference, in order to prevent the drawing from being complicated, in one exemplary embodiment of the present invention, a state in which the positive electrode active material is coated on both surfaces of the positive electrode plate 210 to form a coating layer is not illustrated.

The pair of separators 230 is formed to be larger than the positive electrode plate 210 and, as described above, may cover the remaining portion of the positive electrode plate 210 excluding the positive electrode tab 211 of the positive electrode plate 210.

In the polymer insulating film unit 250, as illustrated in FIG. 3, a punching space S in which the positive electrode plate 210 is accommodated may be formed.

A shape of the punching space S may be diversely selected corresponding to the shape of the positive electrode plate 210. In the exemplary embodiment of the present invention, since the positive electrode plate 210 has a rectangular shape, it is illustrated that the punching space S also has a rectangular shape.

Further, the punching space S may be larger than the positive electrode plate 210 so that the positive electrode plate 210 is accommodated therein with intervals from other components. That is, when the positive electrode plate 210 is accommodated in the punching space S, an interval or a gap may be formed between the edge of the positive electrode plate 210 and the polymer insulating film unit 250.

For reference, in the exemplary embodiment of the present invention, it has been described and illustrated that the polymer insulating film unit 250 is formed to have a rectangular frame shape as a whole to form a rectangular punching space S, but it is not limited thereto. That is, the polymer insulating film unit 250 may be formed to enclose at least two sides of the positive electrode plate 210. In other words, the polymer insulating film units 250 may be disposed on both sides of a vertical direction (a longitudinal direction) of the positive electrode plate 210 to form a punching space S to accommodate the positive electrode plate 210 therein or may be disposed on both sides of a horizontal direction (a width direction) of the positive electrode plates 210 to form a punching space S to accommodate the positive electrode plate 210 therein.

At least three layers of polymer insulating film units 250 may be formed. For example, the polymer insulating film unit 250 may include an upper layer, an intermediate layer, and a lower layer and the upper layer and the lower layer may be formed of ethylene vinyl acetate. Here, the upper layer and the lower layer may be melted by heat and have an adhesive component so that in addition to ethylene vinyl acetate, other materials having the above-mentioned property may be used therefor. That is, an adhesive component is applied on the upper layer and the lower layer of the polymer insulating film unit 250 and the adhesive component may be any one selected from the group of high-temperature melting adhesive materials consisting of ethylene vinyl acetate, ethylene ethyl acetate, an ethylene acrylic acid based compound, an ionomer-based compound, polyethylene, and polyvinyl butyral.

In the meantime, the intermediate layer of the polymer insulating film unit 250 may be formed of polyethylene terephthalate. Further, the intermediate layer of the polymer insulating film unit 250 may be formed by any one selected from a group consisting of a polyolefin resin film, a polyester resin film, a polystyrene resin film, a polyimide film, a polyamide film, a fluorocarbon resin film, an ABS film, a polyacrylic film, an acetal film, and a polycarbonate film.

As illustrated in FIG. 2, the positive electrode body 200 may be formed such that the positive electrode plate 210, the separator 230, and the polymer insulating film unit 250 are integrally formed. More specifically, the positive electrode plate 210 is accommodated in a space formed by the separator 230 and the polymer insulating film unit 250. The positive electrode body 200 configured as described above is a unique technology possessed by the applicant and is referred to as a "pocketing positive electrode body" for the sake of convenience.

The pocketing positive electrode body 200 illustrated in FIG. 2 is configured such that the polymer insulating film unit 250 between the upper and lower separators 230 outwardly protrudes from the end of the separators 230, which is different from the existing pocketing positive electrode body of the applicant. Here, a portion of the polymer insulating film unit 250 which outwardly protrudes from the separator 230 may be used to be bonded or fixed to at least one negative electrode body 230 laminated on or below the positive electrode body 200.

As described above, the positive electrode body 200 and the negative electrode body 300 are bonded or be fixed to each other using the portion of the polymer insulating film unit 250 which outwardly protrudes from the separator 230 so that the positive electrode body 200 and the negative electrode body 300 of the thin film may be bonded or fixed to each other without using a separate tape or binder.

A portion of the polymer insulating film unit 250 which is interposed between one pair of separators 230, that is, a portion covered by one pair of upper and lower separators 230 is bonded to the pair of separators 230. Further, a portion which outwardly protrudes from the pair of separators 230, that is, a portion which is not covered by the pair of separators 230 may be bonded to the negative electrode body 300. As described above, a portion of the polymer insulating film unit 250 which is bonded to the negative electrode body 300 is exposed to the outside of the pair of separators 230 to be bonded to the negative electrode body 300.

In other words, the polymer insulating film unit 250 is not only bonded to the pair of separators 230 to form the pocketing positive electrode body 200 and but also bonded to the negative electrode body 300 laminated thereon or therebelow to maintain a laminated state of the positive electrode body 200 and the negative electrode body 300. As described above, the thin film battery 100 according to the exemplary embodiment of the present invention may bond the thin negative electrode body 300 and the positive electrode body 200 without using a tape or a binder to fix them each other.

Here, the polymer insulating film unit 250 which is bonded to the negative electrode body 300 is exposed outwardly from the pair of separators 230 to be disposed on both ends of the vertical direction or the horizontal direction of the positive electrode plate 210. In FIGS. 1 to 5, it is illustrated that the portion of the polymer insulating film unit 250 which is bonded to the negative electrode body 300 is disposed on both ends of the vertical direction of the positive electrode plate 210 and in FIG. 6, it is illustrated that the portion of the polymer insulating film unit 250 which is bonded to the negative electrode body 300 is disposed on both ends of the horizontal direction of the positive electrode plate 210.

The polymer insulating film unit 250 which is exposed to the outside of the pair of separators 230 to be disposed on both ends of the vertical direction of the positive electrode plate 210 may be formed along the entire both ends of the vertical direction of the positive electrode plate 210 or may be formed in a part of the vertical direction of the positive electrode plate 210. Further, when the polymer insulating film unit 250 is exposed to the outside of the pair of separators 230 to be disposed on both ends of the horizontal direction of the positive electrode plate 210, the polymer insulating film unit 250 may be formed along the entire horizontal direction of the positive electrode plate 210 or may be formed in a part of the horizontal direction of the positive electrode plate 210.

For reference, the portion of the polymer insulating film unit 250 which is exposed to the outside of the pair of separators 230 to be bonded to the negative electrode body 300 may protrude by approximately 0.5 mm to be exposed from the ends of the pair of separators 230. Further, the portion of the polymer insulating film unit 250 which is exposed to the outside of the pair of separators 230 may protrude from the ends of the pair of separators 230 with various shapes to be bonded to the negative electrode body 300.

The end (edge) of the polymer insulating film unit 250 which outwardly protrudes from the pair of separators 230 may be formed to be aligned with the end (edge) of the negative electrode body 300. As described above, in order to exhibit the performance of the thin film battery 100, the positive electrode plate 210 needs to be smaller than the negative electrode plate 310 and the entire positive electrode plate 210 is located inside the edge of the negative electrode plate 310. Therefore, it is important to laminate the positive electrode body 200 and the negative electrode body 300 such that the edge of the positive electrode plate 210 does not deviate from the edge of the negative electrode plate 310. Specifically, it becomes even more important when the thin film batteries 100 are mass-produced. When the positive electrode body 200 and the negative electrode body 300 are bonded while the edge of the positive electrode plate 210 deviates from the edge of the negative electrode plate 310, defective products having bad performance may be generated.

According to the exemplary embodiment of the present invention, in the thin film battery 100, the end (edge) of the polymer insulating film unit 250 which outwardly protrudes from the pair of separators 230 is aligned with the end (edge) of the negative electrode body 300. Therefore, the positive electrode body 200 and the negative electrode body 300 may be bonded to each other while the edge of the positive electrode plate 210 does not deviate from the edge of the negative electrode plate 310. By doing this, when the positive electrode body 200 and the negative electrode body 300 are bonded while aligning the end (edge) of the polymer insulating film unit 250 which outwardly protrudes from the separator 230 with the end (edge) of the negative electrode body 300, the positive electrode body 200 and the negative electrode body 300 may be laminated while the edge of the positive electrode plate 210 does not deviate from the edge of the negative electrode plate 310. Here, not all the edges of the negative electrode body 300 need to be aligned with the edge of the polymer insulating film unit 250 and as illustrated in FIG. 3, it is sufficient to align only two facing sides among four sides of a rectangle with each other.

In the meantime, as illustrated in FIG. 1, the positive electrode tab 211 of the positive electrode plate 210 may be formed to be exposed to the outside of the separator 230 without being covered by the separator 230.

The negative electrode body 300 may include the negative electrode plate 310 provided with a carbonaceous negative electrode active material which absorbs and discharges lithium and a negative electrode tab 311.

The negative electrode plate 310 may be formed to be larger than the positive electrode plate 210 and the above-mentioned negative electrode active material is coated on both surfaces thereof to form coating layers. For reference, in order to prevent the drawing from being complicated, in one exemplary embodiment of the present invention, a state in which the negative electrode active material is coated on both surfaces of the negative electrode plate 310 to form a coating layer is not illustrated.

Further, when the polymer insulating film unit 250 is disposed on both ends of the vertical direction of the positive electrode plate 210, some portions of the negative electrode tab 311 of the negative electrode plate 310 may be bonded to the polymer insulating film unit 250.

As illustrated in FIG. 1, the positive electrode body 200 and the negative electrode body 300 may be laminated such that the negative electrode tab 311 is in contact with the polymer insulating film unit 250 protruding outwardly from the separator 230 in the positive electrode body 200. In this state, the polymer insulating film unit 250 of the positive electrode body 200 and the negative electrode tab 311 are bonded to each other to bond and fix the negative electrode body 300 and the positive electrode body 200 to each other. In this case, a width of the negative electrode tab 311 may be larger than a width of the polymer insulating film unit 250 corresponding to the negative electrode tab 311. When two negative electrode bodies 300 are laminated on and below the positive electrode body 200, negative electrode tabs 311 of the upper and lower negative electrode bodies 300 need to be electrically connected to each other. However, when the width of the negative electrode tab 311 is smaller than the width of the corresponding polymer insulating film unit 250, the negative electrode tab 311 is blocked by the polymer insulating film unit 250 so that the negative electrode tabs 311 may not be connected to each other. Therefore, in order to connect the negative electrode tabs 311 to each other, the width of the negative electrode tab 311 may be formed to be larger than the width of the polymer insulating film unit 250.

The remaining portion of the negative electrode tab 311 which is not bonded to the polymer insulating film unit 250 may be connected to an external connection terminal which is not illustrated and is connected to a facing negative electrode tab 311 of the negative electrode body 300.

In the meantime, referring to FIGS. 1 to 6, the positive electrode tab 211 and the negative electrode tab 311 are provided at the same side but do not overlap each other, but are not limited thereto. For example, the positive electrode tab 211 and the negative electrode tab 311 may be provided not at the same side, but at opposite sides. As described above, the positions, the sizes, and the shapes of the positive electrode tab 211 and the negative electrode tab 311 may be freely selected.

As mentioned above, as illustrated in FIG. 5, a sum D1 of a length of the separator 230 of the positive electrode body 200 and a length of the vertical direction of the polymer insulating film unit 250 which is exposed outwardly from the separator 230 in the vertical direction may be equal to a length D2 of the vertical direction of the negative electrode plate 310.

Figure 6:
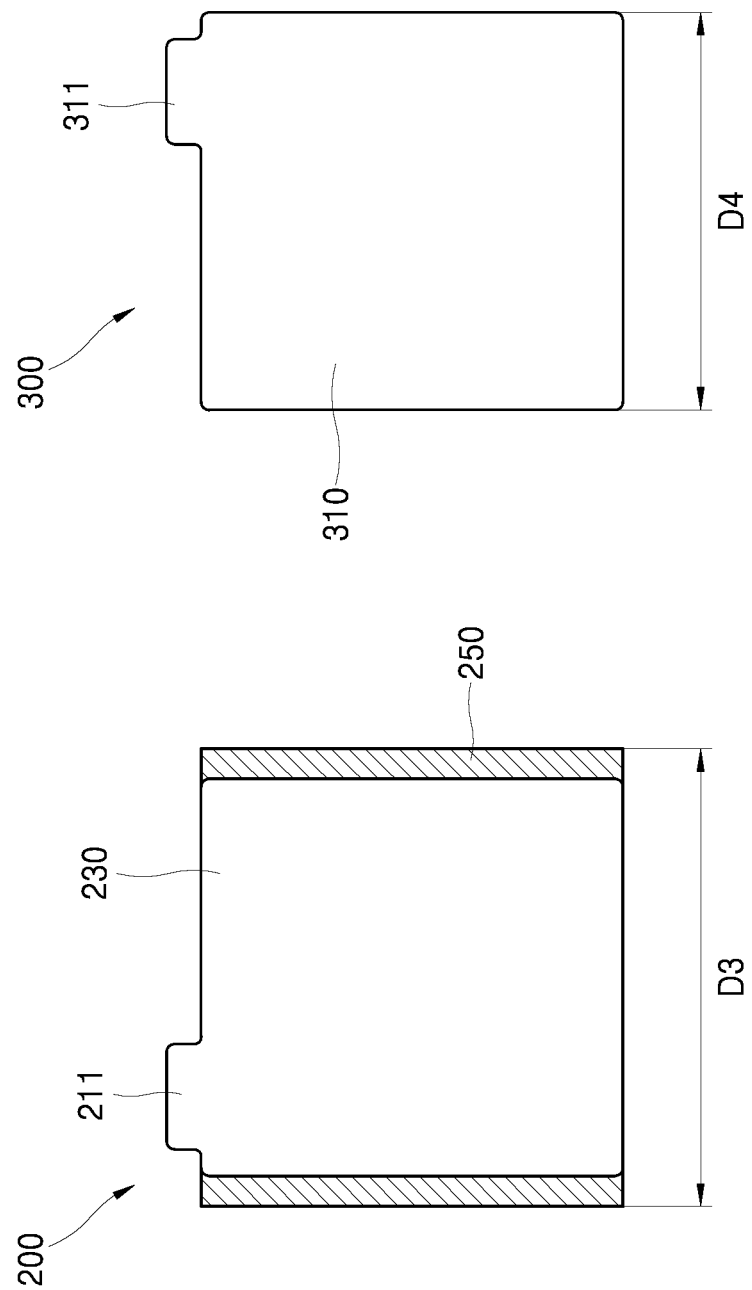
FIG. 6 is a plan view of a positive electrode body and a negative electrode body according to another exemplary embodiment of the present invention.

Further, as illustrated in FIG. 6, a sum of a length of the horizontal direction of the separator 230 and a length D3 of the horizontal direction of the polymer insulating film unit 250 which is exposed outwardly from the separator in the horizontal direction may be equal to a length D4 of the horizontal direction of the negative electrode plate 310.

This is to prevent borders (edge or end) of the negative electrode body 300 and the positive electrode body 200 from being misaligned with each other when the negative electrode body 300 and the positive electrode body 200 are laminated to facilitate a laminating operation and also prevent the electrode active surfaces of the positive electrode plate 210 and the negative electrode plate 310 from being misaligned with each other.

That is, when the negative electrode plate 310 having a larger length and a larger width than those of the positive electrode plate 210 is laminated on the positive electrode plate 210, the edges are not naturally aligned with each other. Therefore, the edge of the positive electrode plate 210 and the edge of the negative electrode plate 310 are not aligned with each other so that the laminating operation is not easy and the performance of the battery may be degraded.

However, in the positive electrode body 200 of the thin film battery 100 according to the exemplary embodiment of the present invention, the pair of separators 230 and the polymer insulating film unit 250 are disposed at the periphery of the positive electrode plate 210. Therefore, the edge of the positive electrode body 200 and the edge of the negative electrode body 300 are aligned with each other to provide the convenience of the laminating operation and prevent the degradation of the performance of the battery.

Further, even though the negative electrode active material may be selectively applied on the portion of the negative electrode plate 310 of the negative electrode body 300 which is bonded to the polymer insulating film unit 250, desirably, the negative electrode active material may not be applied, thereby reducing the waste of the material.

Further, the negative electrode body 300 may be laminated on an upper portion and a lower portion of the positive electrode body 200 or may be laminated on any one of the upper portion or the lower portion of the positive electrode body 200. However, when the negative electrode body 300 is laminated on any one of the upper portion or the lower portion of the positive electrode body 200, a negative electrode active material may not be coated on a surface of the negative electrode plate 310 which does not face the positive electrode body 200. For example, as illustrated in FIG. 1, when two negative electrode bodies 300 are laminated on the upper portion and the lower portion of the positive electrode body 200, respectively, the negative electrode active material may be coated or applied on one surface of the negative electrode plate 310 of the negative electrode body 300. That is, it is sufficient to provide the negative electrode active material only on the surface which faces the positive electrode body 200.

The positive electrode body 200 and the negative electrode body 300 configured as described above may be bonded or pressured in a laminated state by a known device or technique using a heating block or a press. In this case, the polymer insulating film unit 250 and the negative electrode body 300 disposed on both ends of the vertical direction or both ends of the horizontal direction of the positive electrode body 200 are bonded to each other so that the thin film positive electrode body 200 and negative electrode body 300 are fixed to each other. Therefore, the coupling force therebetween may be further enhanced without using a tape or a binder and without degrading the battery performance.

In the thin film battery 100 according to the exemplary embodiment of the present invention configured as described above, the positive electrode body 200 and the negative electrode body 300 are coupled to each other while intactly maintaining a contact active surface of the positive electrode body 200 and the negative electrode body 300 so that the battery capacity is maintained as it is, thereby preventing the degradation of the battery performance.

Further, in the thin film battery 100 according to the exemplary embodiment of the present invention, the positive electrode body 200 and the negative electrode body 300 are coupled to each other without using an adhesive applying agent such as a tape or a binder so that a cost for a material of a battery may be saved.

Furthermore, in the thin film battery 100 according to the exemplary embodiment of the present invention, there is no need to separately perform an operating process of coupling the positive electrode body 200 and the negative electrode body 300 to each other so that a manufacturing process of the battery is simplified, thereby reducing a manufacturing cost.

Although the specific exemplary embodiment of the present invention has been described, it should be understood that various modifications may be allowed without departing from the scope of the present invention.

Therefore, the scope of the present invention should not be defined by being limited to the embodiments described, but should be defined by the claims to be described below and those equivalent to the claims.

INDUSTRIAL APPLICABILITY

The present invention relates to a thin film battery which may be utilized as an ultra small-sized power source to be widely used as a power of portable electronic devices and information communication devices which tend to be small-sized. Specifically, due to a small thickness of the thin film battery, the thin film battery may be more appropriately applied to a thin electronic device such as a smart credit card.

The invention claimed is:

1. A thin film battery, comprising:
a positive electrode body; and
a negative electrode body having a pair of negative electrode plates which are respectively laminated on an upper portion and a lower portion of the positive electrode body,
wherein the positive electrode body includes:
a positive electrode plate on which a positive electrode active material is disposed;
a pair of separators which respectively covers an upper surface and a lower surface of the positive electrode plate; and
a single polymer insulating film interposed between the pair of separators, and having a punched space in which the positive electrode plate is accommodated,
wherein the single polymer insulating film includes a first portion and a second portion, in which the first portion is covered by the pair of separators and is bonded to the pair of separators, and the second portion is uncovered by the pair of separators to outwardly protrude from edges of the pair of separators and is bonded to the negative electrode plates of the negative electrode body, and
wherein the single polymer insulating film is bonded to the pair of separators to form a pocket in the positive electrode body, and bonded to the negative electrode plates laminated thereon to maintain a laminated state of the positive electrode body and the negative electrode body,
wherein the second portion of the single polymer insulating film includes a first section and a second section protruding outwardly from the edges of the separators in opposite directions, and the first section is bonded to negative electrode tabs which respectively protrude from the negative electrode plates in the same direction,
wherein a horizontal length of the first section is smaller than a horizontal length of each of the negative electrode tabs, and
wherein, when the pair of negative electrode plates are laminated on and below the positive electrode body, parts of the negative electrode tabs of the two negative electrode plates not covering the first section are directly contacted with each other so that the two negative electrode plates are connected to each other.

2. The thin film battery according to claim 1, wherein the positive electrode body includes a positive electrode tab on which the positive electrode active material is not applied, the pair of separators cover the upper and lower surfaces of the positive electrode plate to expose the positive electrode tab to outside the pair of separators, and the second portion of the single polymer insulating film which is bonded to the negative electrode plates of the negative electrode body is protruded along a vertical length or a horizontal length of the positive electrode plate, or is protruded along a part of the vertical length or a part of the horizontal length of the positive electrode plate.

3. The thin film battery according to claim 1, wherein a sum of a vertical length of the separators and a vertical length of the second portion of the single polymer insulating film which is exposed to a vertical direction of the separators is equal to a vertical length of the negative electrode plate.

4. The thin film battery according to claim 1, wherein a sum of a horizontal length of the separators and a horizontal length of the second portion of the single polymer insulating film which is exposed to a horizontal direction of the separators is equal to a horizontal length of the negative electrode plate.

5. The thin film battery according to claim 1, wherein the positive electrode body and the negative electrode body are laminated such that an edge of the second portion of the single polymer insulating film which is exposed from the separators is aligned with an edge of the negative electrode body.

6. The thin film battery according to claim 5, wherein the edge of the negative electrode body and the edge of the second portion of the single polymer insulating film are aligned to face with each other.

7. The thin film battery according to claim 1, wherein the single polymer insulating film includes an upper layer, an intermediate layer, and a lower layer, and wherein the upper layer and the lower layer are formed of ethylene vinyl acetate and the intermediate layer is formed of polyethylene terephthalate so that the upper layer or the lower layer is melted by heat to be bonded to the negative electrode plate of the negative electrode body.

* * * * *